(12) United States Patent
Jones et al.

(10) Patent No.: US 8,298,480 B2
(45) Date of Patent: Oct. 30, 2012

(54) MANUFACTURE OF SPECIALIZED ALLOYS WITH SPECIFIC PROPERTIES

(75) Inventors: William F. Jones, York, SC (US); Srikanth C. Kottilingam, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1540 days.

(21) Appl. No.: 11/082,103

(22) Filed: Mar. 16, 2005

(65) Prior Publication Data

US 2006/0208032 A1 Sep. 21, 2006

(51) Int. Cl.
*C22C 1/06* (2006.01)
(52) U.S. Cl. .......................................... 419/46; 228/101
(58) Field of Classification Search .................... 419/46
See application file for complete search history.

(56) References Cited

U.S. PATENT DOCUMENTS

| | | | |
|---|---|---|---|
| 4,381,944 A | 5/1983 | Smith, Jr. et al. | |
| 5,240,491 A | 8/1993 | Budinger et al. | |
| 6,484,924 B1 | 11/2002 | Forrest | |
| 6,543,671 B2 * | 4/2003 | Hatten et al. | 228/112.1 |
| 6,585,148 B2 | 7/2003 | Aono et al. | |
| 6,674,047 B1 | 1/2004 | Hughes et al. | |
| 6,712,916 B2 | 3/2004 | Mishra et al. | |
| 6,726,085 B2 * | 4/2004 | Litwinski et al. | 228/112.1 |
| 6,779,704 B2 | 8/2004 | Nelson et al. | |
| 2002/0079351 A1 | 6/2002 | Mishra et al. | |
| 2003/0042292 A1 | 3/2003 | Hatten et al. | |
| 2004/0004107 A1 | 1/2004 | Litwinski | |
| 2004/0050913 A1 | 3/2004 | Philip | |
| 2004/0129763 A1 | 7/2004 | Burford et al. | |
| 2004/0255460 A1 | 12/2004 | Bampton et al. | |
| 2005/0242158 A1 * | 11/2005 | Bolser | 228/112.1 |
| 2006/0108394 A1 * | 5/2006 | Okaniwa et al. | 228/101 |

FOREIGN PATENT DOCUMENTS

WO WO 02/100586 A1 12/2002

* cited by examiner

*Primary Examiner* — Roy King
*Assistant Examiner* — Christopher Kessler

(57) ABSTRACT

A method of manufacturing specialized alloys having specific properties and an alloy made using this method. The methods involve the use of micro and/or nano-sized particles that are mixed into an alloy using a friction stir welding method. The micro and/or nano-sized particles are used to alter one or more characteristics of the alloy in the locations in which the micro and/or nano-sized particles are added. The micro and/or nano-sized particles may be metal particles, non-metal particles, or a combination thereof.

15 Claims, No Drawings

MANUFACTURE OF SPECIALIZED ALLOYS WITH SPECIFIC PROPERTIES

FIELD OF THE INVENTION

This invention is directed generally to methods of creating alloys and mixtures of materials, and more particularly to methods of creating specialized alloys and specialized mixtures of materials.

BACKGROUND

Alloys are being used in a great number of different environments. For example, the aerospace, shipbuilding and railway industries are all beginning to utilize various alloys for a variety of different purposes. Examples include large fuel tanks and other containers for space launch vehicles, cargo decks for high-speed ferries, and roofs for railway carriages.

There are a variety of methods for increasing the strength of metallic alloys. Some of the most common methods include cold working, precipitation hardening and quench and tempering. All of these methods utilize a process wherein the metal lattice is altered such that the movement of dislocations is limited. In the case of cold working, the metal is deformed such that many dislocation intersect and lock themselves together. In the case of precipitation, hardening small precipitates are produced in the metal lattice that pin and restrict the movement of dislocations. The same holds true for quenched and tempered alloys.

All of these systems work well but are limited in that they generally only alter the strength of the material and require alloy systems (two or more constituents) where the various elements are compatible and soluble in the matrix metal. These methods have not been effective in altering the physical properties of metallic alloys.

Current research in the area of nanotechnology is showing that physical and mechanical properties of metals may be altered through the addition of micro and nano particles to the metal. The benefits of these discoveries is that the micro and nano particles do not have to be soluble or chemically compatible with the matrix system. The problem arises in how to mix the micro and nano particles into the metal matrix so they perform their required function.

Accordingly, what is needed is a method of forming specialized alloys that permits the characteristics of the alloys to be altered. Also what is needed is a method of forming specialized alloys that improves one or more mechanical properties without the negatives associated with prior art techniques.

SUMMARY OF THE INVENTION

This present invention provides a method for producing specialized alloys. The methods involve the use of micro and/or nano-sized particles that are mixed into an alloy using a friction stir welding method. The micro and/or nano-sized particles are used to alter one or more characteristics of the alloy in the locations in which the micro and/or nano-sized particles are added. The micro and/or nano-sized particles may be metal particles, non-metal particles, or a combination thereof, depending on the selected characteristics to be altered by the method. In addition, the present invention provides an alloy with enhanced characteristics made by the methods of the present invention.

In one aspect, the present invention provides a method of producing specialized alloys including the steps of placing particles on a selected area of an alloy, and friction stir welding the selected area of the alloy to plasticize the area of the alloy to mix the particles into the selected area of the alloy, wherein the particles have a size of from about 0.1 nm to about 500 µm. In addition, the present invention also includes alloys made from these methods.

These and other embodiments are described in more detail below.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides methods of creating specialized alloys. The methods involve the use of micro and/or nano-sized particles that are mixed into and/or joined onto the selected alloy using a friction stir welding method. The micro and/or nano-sized particles are used to alter one or more characteristics of the alloy in the locations in which the micro and/or nano-sized particles are added. The particles may be used to alter selected areas of the alloy, or may be used to form a solid alloy section having the micro and/or nano-sized particles, thereby altering the entirety of the volume area of the alloy.

Friction welding is a proven technology that is finding more and more applications in industry. It is a solid-state method that yields large economic benefits because it avoids many problems associated with rapid solidification of molten material that occurs in traditional fusion welding methods. Friction stir welding includes many benefits over contemporary fusion welding methods. The primary benefit of friction stir welding is that it does not melt the materials being joined and thus several other secondary benefits arise. These benefits include low distortion in long welds, low fumes, low porosity, low splatter, and excellent mechanical properties regarding tensile strength. Furthermore, the method has one or more advantages as the method uses a non-consumable tool, has no need for filler wire, has no need for gas shielding, and/or has a tolerance for imperfect weld preparations such as the presence of oxide in the weld region. The method is especially useful for preventing significant heat damage or otherwise altering the properties of the original material being welded.

Friction stir welding produces a plasticized region of material without melting the matrix material. This forms the basis for this invention in that the friction stir welding process is used to mix the particles into the plasticized metal around the rotating tool creating. The benefit of friction stir welding process for mixing the particles in the metal is because it does not melt the base metal or the particles so a variety of mixtures can be obtained, some of which would not be possible with conventional metal processes.

The methods of the present invention use friction stir welding to mix particles into an alloy to alter the properties of the alloy in the areas in which the particles are added. In one embodiment, the particles may be added to all or substantially all of the volume area of the alloy. In alternative embodiments, the particles may be added to one or more areas of the surface of the alloy. As a result, the methods of the present invention offer better control of the finished product as the friction stir welding can control the placement of the particles, thereby resulting in alloys having improved properties only in the selected areas. The decision as to the amount of the surface area to be mixed is based on one or more factors including, but not limited to, the alloy, the particles to be mixed, the selected characteristics of the mixed alloy, and/or the intended use of the mixed alloy.

The particles are added to the alloy and are mixed into the metal using a friction stir welding technique. Due to friction stir welding techniques, the base alloy plasticizes to some extent to permit the particles to be mixed thereto. Nevertheless, depending on the selected embodiment, it is possible, but not critical, that the particles also plasticize such that the particles form mechanical bonds with the alloy. Accordingly, in some embodiments it is contemplated that the particles will be mechanically joined to the alloy. As used herein, "joined" to an alloy refers to those embodiments wherein the alloy and the particle are connected mechanically and/or chemically, thereby "joining" the particle to the alloy.

However, it is also contemplated that, in alternative embodiments, the particles will not plasticize, but rather will remain intact and will be mixed into the alloy due to the plasticization of the alloy from the friction stir welding process. Whether the particles are joined to the alloy or whether the particles are simply mixed in the alloy but are not joined, one of the advantages of the methods of the present invention is that, in select embodiments, the resulting alloy may have a uniform or substantially uniform distribution of the particles in the areas of the alloy that are mixed. While uniform distribution is not required, or may not even be beneficial in certain instances, the methods of the present invention are capable of achieving this aspect.

The methods of the present invention may be used with a variety of different base alloys. Representative examples of alloys that may be mixed in the present invention include, but are not limited to, aluminum alloys, copper, steel, or a combination thereof. In general, any alloy that may be plasticized through a friction stir welding process to permit particles to be mixed thereto may be used in the present invention.

In one embodiment, the methods of the present invention are performed by placing the particles to be mixed in the alloy on the selected surface of the alloy ahead of the friction stir welding tool. As discussed, this may be on selected portions of the alloy or on the entirety of the surface area of the alloy. In one embodiment, the friction welding tool is rotated and slowly contacted with the area in which the particles are located. Through the mechanism of friction stir welding, the particles are then mixed into the alloy. It is to be recognized, however, that this example is not the only friction stir welding system that may be used and any other friction stir welding tool besides a rotating one may also be used in the present invention.

In an alternative embodiment, the friction stir welding tool may be altered or reconfigured such that the friction stir welding tool has a head that includes one or more holes from which the particles may be fed into the plasticized stirred metal zone. These holes may resemble the coolant holes in drills and mills. The remaining steps of the method would remain substantially the same as in those embodiments wherein the particles are placed ahead of the friction stir welding tool prior to welding.

The particles used in the present invention may be of any size capable of being mixed into the alloy of interest to alter the properties of the alloy. Accordingly, in the present invention, the particles are nano and micro sized particles. The particles used in the present invention may be any particles capable of altering one or more selected characteristics of the alloy to which the particles are added. In one embodiment, the particles have a size of from about 0.1 nm to about 500 µm. In yet another embodiment, the particles have a size of from about 1 nm to about 10 µm. In still another embodiment, the particles have a size of from about 10 nm to about 1 µm.

Depending on one or more factors including, but not limited to, the alloy used, the properties to be enhanced, the particles, and/or the friction stir welding method used, the methods of the present invention may use particles having substantially the same size. In another embodiment, particles of different sizes may be used, again, depending on one or more factors.

Depending on the alloy, the property of the alloy to be altered, and/or the degree by which the property is to be altered, the nano and/or micro-sized particles may be any type of material. For example, if the electrical conductivity of the alloy is to be increased, then a highly conductive particle, such as a carbon nano-tube may be used. Alternatively, if the electrical conductivity of the alloy is to be decreased, then a low conductivity or a non-conductive particle, such as one made from an insulator material, may be used. Conversely, if the strength of the alloy is to be increased, then the methods of the present invention may use any particle that is stronger than the underlying alloy to which it is applied.

In yet another alternative embodiment, a plurality of different particles may be used if more than one property of the alloy is to be altered. For example, certain particles may be used to enhance the strength of the alloy in the location the particles are added. In addition, highly conductive particles may also be included in these areas to increase the conductivity of the alloy in these strengthened areas. Other particles may be used as well, depending on the selected characteristics to be modified.

In yet another alternative embodiment, the alloy may be modified with particles designed to increase a selected property in one area of the alloy, while other particles may be added in other areas to decrease the selected property. For example, if the designed alloy is to have areas that are highly conductive, but have the remainder of the alloy be non-conductive or substantially non-conductive, then highly conductive particles may be added to certain areas of the alloy and insulating or non-conductive particles may be added to the other areas of the alloy. This may also be applicable with other properties that may be modified including, but not limited to, the strength of the alloy.

Accordingly, for the methods of the present invention, the particles that may be friction stir welded into the alloy may include any particle capable of being friction stir welded into an alloy. This may include, in some embodiments, metallic particles. Alternatively, depending on the selected property or properties to be modified, the particles may be non-metallic. In yet other embodiments, a combination of metallic and non-metallic particles may be employed, either in the same area or in different areas of the alloy.

The alloys of the present invention may be used in a wide variety of different industries and applications. Examples of industries and/or applications that may use the alloys of the present invention include, but are not limited to, automotive, aerospace, shipbuilding, and/or railway industries, as well as selected areas of nanotechnology. In addition, these alloys may be used in the power generation industry, such as, for example, the production of parts used in generators such as increasing the electrical conductivity of copper by mixing carbon nano tubes into the copper alloy. In general, any industry or application that could benefit from an alloy having one or more selected properties that have been modified to achieve a more desirable property may use the alloys and/or methods of the present invention.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method for creating a specialized alloy comprising:
   applying first particles to a selected area of an alloy, wherein the first particles alter a selected property of the alloy;
   applying second particles to another selected area of the alloy, wherein the second particles alter the selected property of the alloy differently than the first particles;
   mixing the first particles into the selected area of the alloy using friction stir welding;
   mixing the second particles into the other selected area using friction stir welding;
   wherein the first and second particles have a size between about 1.0 nm and about 500 μm.

2. The method of claim 1, wherein the first particles enhance a property of the alloy in the selected area, and the second particles reduce the property of the alloy in the other selected area.

3. The method of claim 2, wherein the first particles enhance the conductivity of the alloy, and the second particles reduce the conductivity of the alloy in the other selected area.

4. The method of claim 1, wherein the first and second particles have a size between about 1 nm and about 10 μm.

5. The method of claim 4, wherein the first and second particles have a size between about 10 nm and about 1 μm.

6. The method of claim 1, wherein the alloy is selected from aluminum alloys, copper alloys, steel alloys, or a combination thereof.

7. The method of claim 1, wherein the particles are placed on a portion of a surface area of the alloy.

8. The method of claim 1, wherein the particles are placed on all of a surface area of the alloy.

9. The method of claim 1, wherein the particles are positioned throughout the entire volume of the alloy.

10. The method of claim 1, wherein the particles are placed on the alloy prior to friction stir welding of the alloy to weld the particles to the alloy.

11. The method of claim 1, wherein the friction stir welding step uses a friction stir welding tool having a head with holes through which the particles are fed into the area to be mixed.

12. The method of claim 1, wherein the particles and the alloy are plasticized during the friction stir welding step such that the particles are joined to the alloy.

13. The method of claim 1, wherein the particles do not plasticize during the friction stir welding step such that the particles are held in place due to plasticization and cooling of the alloy.

14. The method of claim 1, wherein the particles are uniformly distributed during the friction stir welding step.

15. The method of claim 1, wherein the particles are selected from metallic particles, non-metallic particles, or a combination thereof.

* * * * *